(12) United States Patent
Kim

(10) Patent No.: US 8,336,167 B2
(45) Date of Patent: Dec. 25, 2012

(54) AUTO HINGE MODULE OF CELLULAR PHONE

(76) Inventor: Si Wan Kim, Bucheon-si (KR)

( * ) Notice: Subject to any disclaimer, the term of this patent is extended or adjusted under 35 U.S.C. 154(b) by 357 days.

(21) Appl. No.: 12/740,843

(22) PCT Filed: Nov. 3, 2008

(86) PCT No.: PCT/IB2008/002947
§ 371 (c)(1),
(2), (4) Date: Jun. 8, 2010

(87) PCT Pub. No.: WO2009/056975
PCT Pub. Date: May 7, 2009

(65) Prior Publication Data
US 2010/0275413 A1    Nov. 4, 2010

(30) Foreign Application Priority Data
Nov. 2, 2007 (KR) .................. 10-2007-0111259

(51) Int. Cl.
*E05F 1/08* (2006.01)
(52) U.S. Cl. .............. 16/303; 16/328; 16/326
(58) Field of Classification Search .......... 16/303, 16/324–330; 361/679.56; 379/433.13
See application file for complete search history.

(56) References Cited

U.S. PATENT DOCUMENTS

| | | | |
|---|---|---|---|
| 6,886,221 B2 * | 5/2005 | Minami et al. | 16/324 |
| 7,117,562 B2 * | 10/2006 | Zuo et al. | 16/303 |
| 7,412,270 B2 * | 8/2008 | Takagi | 455/575.1 |
| 7,418,279 B2 * | 8/2008 | Takagi | 455/575.1 |
| 7,555,119 B2 * | 6/2009 | Yang | 379/433.11 |
| 7,653,968 B2 * | 2/2010 | Kubota | 16/330 |
| 7,913,359 B2 * | 3/2011 | Duan et al. | 16/330 |
| 7,974,666 B2 * | 7/2011 | Kosugi et al. | 455/575.3 |
| 8,079,115 B2 * | 12/2011 | Zhang et al. | 16/326 |
| 2007/0094843 A1 * | 5/2007 | Yang | 16/330 |
| 2008/0201900 A1 * | 8/2008 | Kubota | 16/221 |

FOREIGN PATENT DOCUMENTS

| | | |
|---|---|---|
| JP | 2007-092794 | 4/2007 |
| KR | 10-2002-0076560 | 10/2002 |
| KR | 10-2003-0043712 | 6/2003 |
| KR | 10-2004-0064334 | 7/2004 |
| KR | 10-0912611 | 8/2009 |

OTHER PUBLICATIONS

International Search Report and Written Opinion from PCT/IB2008/002947, now published as WO 2009/056975 from which the instant application is a national phase, 9 pages.

(Continued)

*Primary Examiner* — Robert J Sandy
*Assistant Examiner* — Matthew Sullivan
(74) *Attorney, Agent, or Firm* — Harness, Dickey & Pierce, P.L.C.

(57) ABSTRACT

The present invention is directed to an automatic hinge module for a cellular phone, which is capable of automatically opening the cellular phone in a one-touch manner. The automatic hinge module of the present invention automatically opens a cellular phone by simply pressing a button. When the button is pressed, a housing coupled to a folder portion of the cellular phone is rotated by an elastic restoring force of a compressed torsion spring, thereby opening the cellular phone.

18 Claims, 17 Drawing Sheets

OTHER PUBLICATIONS

Korean Office Action dated Feb. 25, 2009 from Korean application No. KR10-2007-0111259 (issued as Korean Patent No. 10-0912611) which is related to the instant application through a priority claim; 3 pages.

Korean Notice of Allowance dated Jun. 29, 2009 from Korean application No. KR10-2007-0111259 (issued as Korean Patent No. 10-0912611) which is related to the instant application through a priority claim; 2 pages.

* cited by examiner (a)

(b)

(a)

(b)

AUTO HINGE MODULE OF CELLULAR PHONE

CROSS REFERENCE TO RELATED APPLICATIONS

This application is a 371 of PCT International Application No. PCT/IB2008/002947 filed Nov. 3, 2008, published as WO 2009/056975 on May 7, 2009, which claims priority to Korean Patent Application No. KR 10-2007-0111259 filed Nov. 2, 2007 (Korean Patent No. 10-0912611, Issued Aug. 11, 2009). The entire disclosure of the above applications are incorporated herein by reference.

TECHNICAL FIELD

The present invention generally relates to an automatic hinge module of a cellular phone, and more particularly to an automatic hinge module of a cellular phone capable of automatically opening a cellular phone in a one-touch manner.

BACKGROUND ART

Various types of portable terminals have been introduced in the art. Generally, the portable terminals may be classified according to the opening and closing operations.

The terminals first began from bar type terminals. Further, the terminals such as flip type terminals, folder type terminals, slide type terminals, pop-up type terminals, slide and rotation type terminals, etc. have been continuously introduced in order to comply with the consumers' demands.

The above terminals became more and more thin and small over the years. Further, such terminals also possess diverse functions in response to the consumers' demands.

For example, the terminals are equipped with speaker devices adapted to play melodies using various types of cords. The terminals also have color displaying devices with millions of pixels.

Further, in addition to essential telephone calling functions, the terminals are also provided with many functions such as playing music (e.g., using MP3 player, etc.) and games as well as providing digital multimedia broadcasting (e.g., using displaying device, etc.).

In particular, the folder type terminal includes a folder as a sub body. The folder can open relative to a main body at a certain angle. Moreover, a hinge module, which joins the folder to the main body, may provide a sensation during opening and closing.

A conventional hinge module may be inserted into a hinge arm of the folder or the main body. It is operated via a relative interlocking with the other hinge arm.

However, in the above-described hinge module of the folder type terminal, a user must open the folder from the main body directly with his/her fingers. Thus, elders, disabled people, etc. have some difficulty in opening the folder.

DISCLOSURE

Technical Problem

The present invention is directed to solving the foregoing problems. It is an object of the present invention to provide an automatic hinge module, which allows a folder to be automatically opened by simply pressing a button in a one-touch manner, thereby enabling users (e.g., elders, disabled, etc.) to easily open the folder.

Technical Solution

In order to achieve the above object, the present invention provides an automatic hinge module for a cellular phone for automatically opening the cellular phone by simply pressing a button. When the button is pressed, a housing coupled to a folder portion of the cellular phone is rotated by an elastic restoring force of a compressed torsion spring, thereby opening the cellular phone.

The hinge module comprises: a hollow first housing; a shaft passing through the first housing; a button coupled to one end of the shaft; a main cam surroundingly coupled to the shaft; a sub cam that is rotatable in camming contact with the main cam; a first spring for elastically supporting the sub cam toward the main cam; a slider rotatably coupled to the shaft and being inserted into the sub cam at one end thereof and into the first housing at the opposite end thereof so as to be rotated together with the sub cam or the first housing; an engagement member fixedly coupled to the shaft for moving the slider in contact therewith; a second spring for elastically supporting the slider; a stopper engaged to the opposite end of the first housing and the opposite end of the shaft; and a torsion spring fixed to the first housing at one end thereof and to the stopper at the other end thereof.

A locking protrusion is protrudingly formed at a peripheral surface of the slider. A first slot-hole, into which one end of the locking protrusion is inserted, is formed at the sub cam. A second slot-hole, into which the opposite end of the locking protrusion is inserted, is formed at the first housing.

The engagement member pushes the slider by a movement of the shaft, thereby separating the locking protrusion of the slider from the first slot-hole formed on the sub cam.

Each of the locking protrusions, the first slot-hole and the second slot-hole is formed so as to be spaced apart in same intervals.

Each of the locking protrusions, the first slot-holes and the second slot-holes is spaced apart at an interval of 120 degrees.

A second sloped surface is formed at the locking protrusion while a first sloped surface is formed at the first slot-hole. The first sloped surface may contact the second sloped surface in a rotational direction of the torsion spring.

The main cam comprises: a fixed cam surroundingly mounted to the shaft and fixedly coupled to the cellular phone; and a holder cam rotatably mounted to the shaft and being in camming contact with the fixed cam and the sub cam therebetween. The shaft is linearly moved separately relative to the fixed cam.

Numerous first cam protrusions are protrudingly formed at the sub cam opposite to the first slot-hole. Multiple first cam grooves, into which the first cam protrusions are inserted, are formed at the holder cam. The first cam protrusions are spaced apart from one another at same intervals as the first slot-holes.

A third slot-hole, into which the locking protrusion of the slider is inserted, is formed at the holder cam.

A second cam protrusion is formed at the fixed cam toward the holder cam. A second cam groove and a third cam groove are formed at the holder cam toward the fixed cam. When the holder cam rotates at 0 degree, the second cam protrusion is seated in the second cam groove. When the holder cam rotates, the second cam protrusion is seated in the third cam groove. An interval between the second cam groove and the third cam groove is identical to a spaced distance between the first cam grooves.

A sloped surface of the third cam groove is gentler than a sloped surface of the second cam groove.

An elongated opening is formed at the fixed cam along a movement direction of the shaft. A securing pin penetrating the shaft is mounted in the elongated opening.

The hinge module further comprises a second housing for surrounding the main cam, the sub cam, the slider and the first spring. The second housing surrounds a portion of the first housing and is rotated together with the first housing.

The opposite end of the shaft is coupled to the stopper. The stopper is inhibited from being rotated by the shaft. The shaft is mounted so as to linearly move relative to the stopper.

An anti-rotation protrusion is protrudingly formed at the opposite end of the shaft. Further, an anti-rotation groove, into which the anti-rotation protrusion is inserted, is formed at the stopper. The shaft is allowed to linearly move separately relative to the stopper. The shaft is inhibited from being rotated relative thereto.

Advantageous Effects

According to the above-described automatic hinge module of a cellular phone of the present invention, since simply pressing a button opens a cover member of the cellular phone, any person can easily open a portable terminal.

DESCRIPTION OF SYMBOLS

Figure 1:
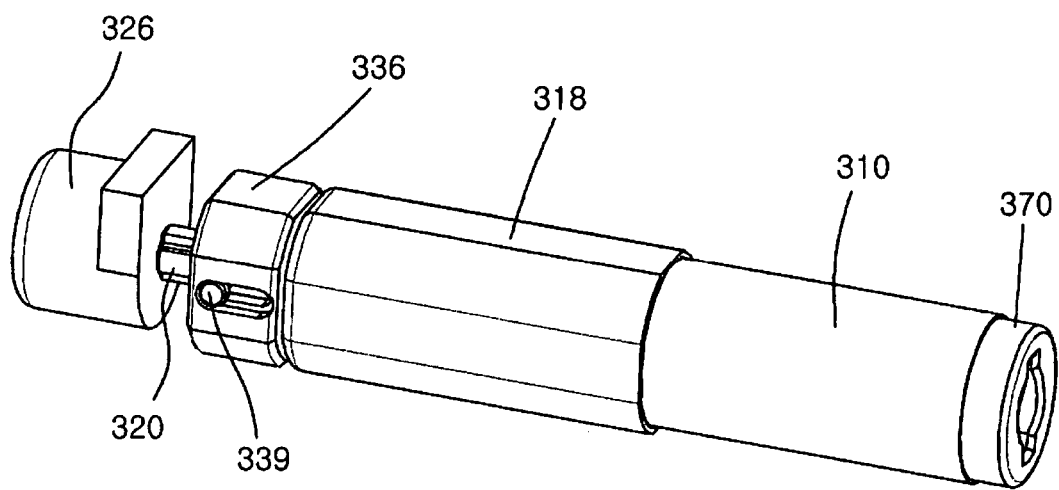
FIG. 1 is a perspective view of an automatic hinge module of a cellular phone according to one embodiment of the present invention.

310: first housing
315: second slot-hole
318: second housing
320: shaft
322: engagement member
324: anti-rotation protrusion
326: button
330: fixed cam
332: second cam protrusion
334, 338: elongated opening
336: cover for fixed cam
339: securing pin
340: holder cam
341: first cam groove
342: second cam groove
343: third cam groove
345: third slot-hole
350: sub cam
351: first cam protrusion
355: first slot-hole
356: first sloped surface
360: slider
365: locking protrusion
366: second sloped surface
370: stopper
374: anti-rotation groove
381: first spring
382: second spring
385: torsion spring
390: main body of cellular phone 395: folder portion of cellular phone

MODE FOR INVENTION

Figure 2:
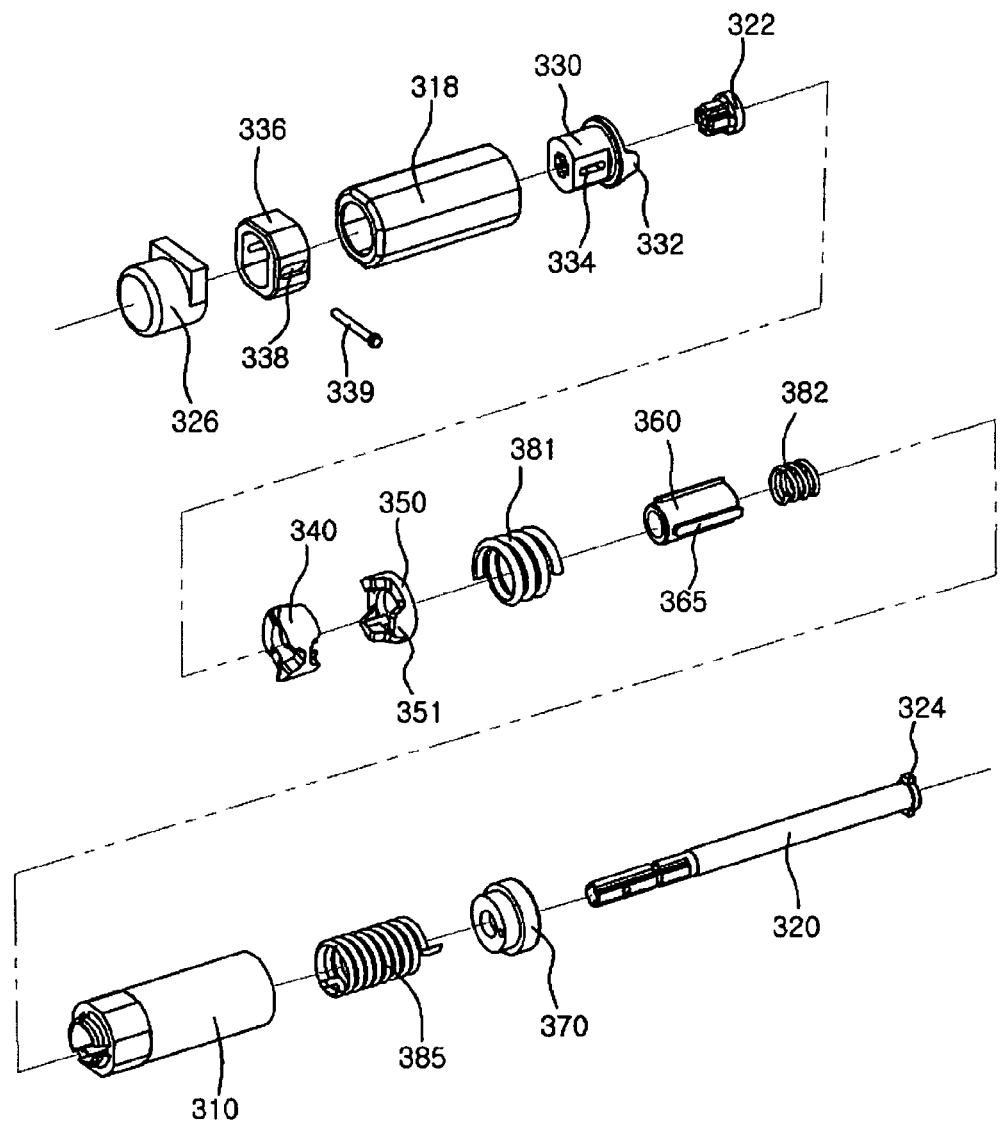
FIG. 2 is an exploded perspective view in one direction showing an automatic hinge module of a cellular phone according to one embodiment of the present invention.
Figure 3:
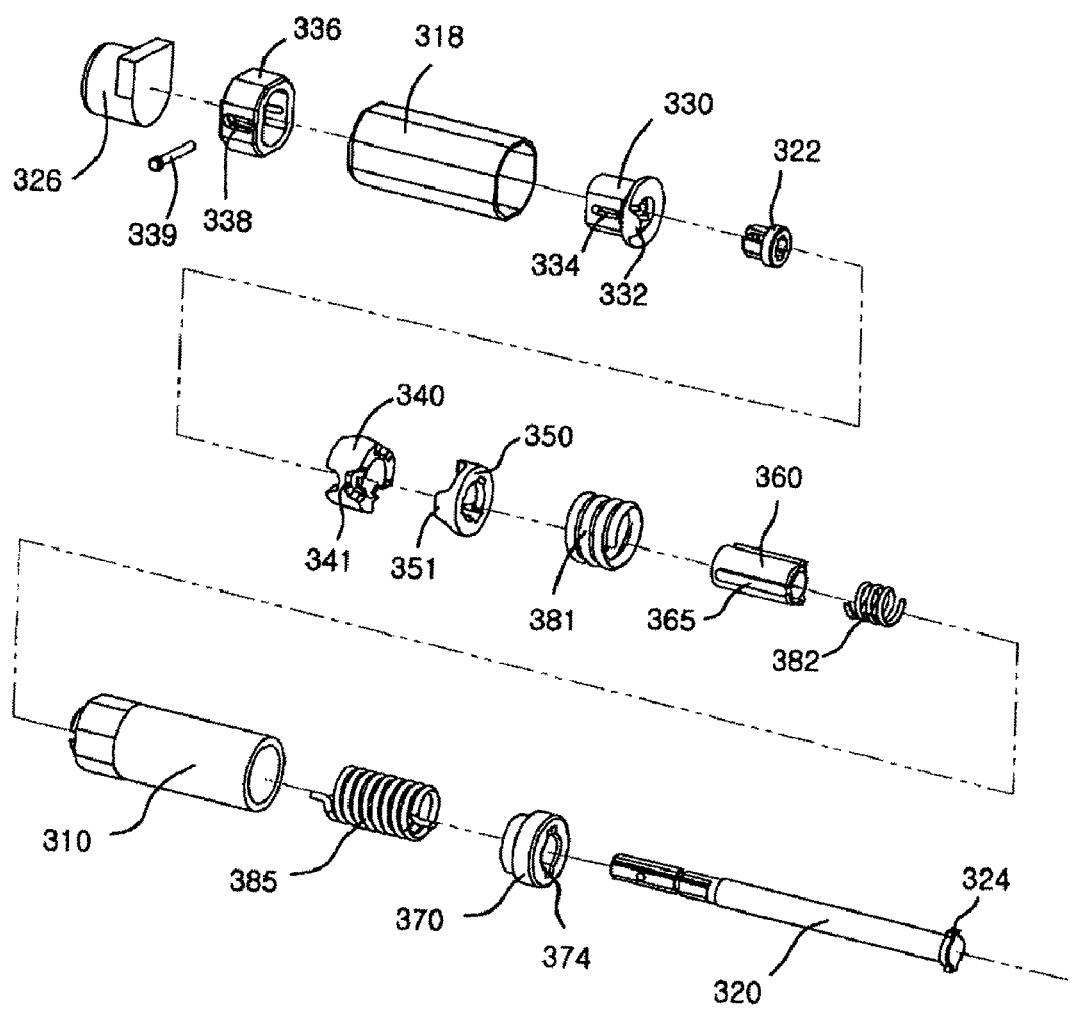
FIG. 3 is an exploded perspective view in another direction showing an automatic hinge module of a cellular phone according to one embodiment of the present invention.
Figure 4:
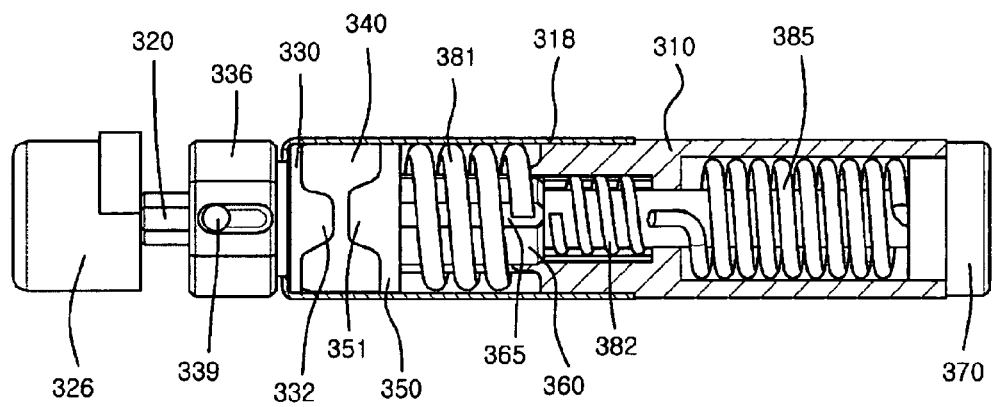
FIGS. 4 and 5 are perspective views showing an automatic hinge module of a cellular phone according to one embodiment of the present invention, wherein some components are shown as cut outs.
Figure 5:
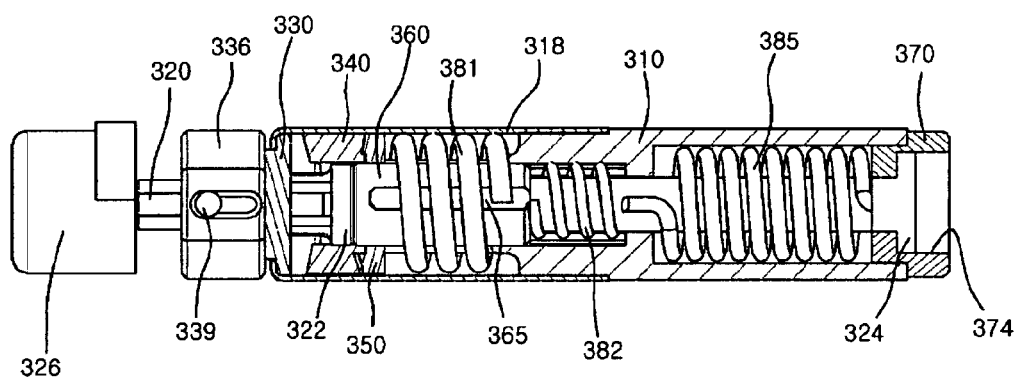
Figure 6:
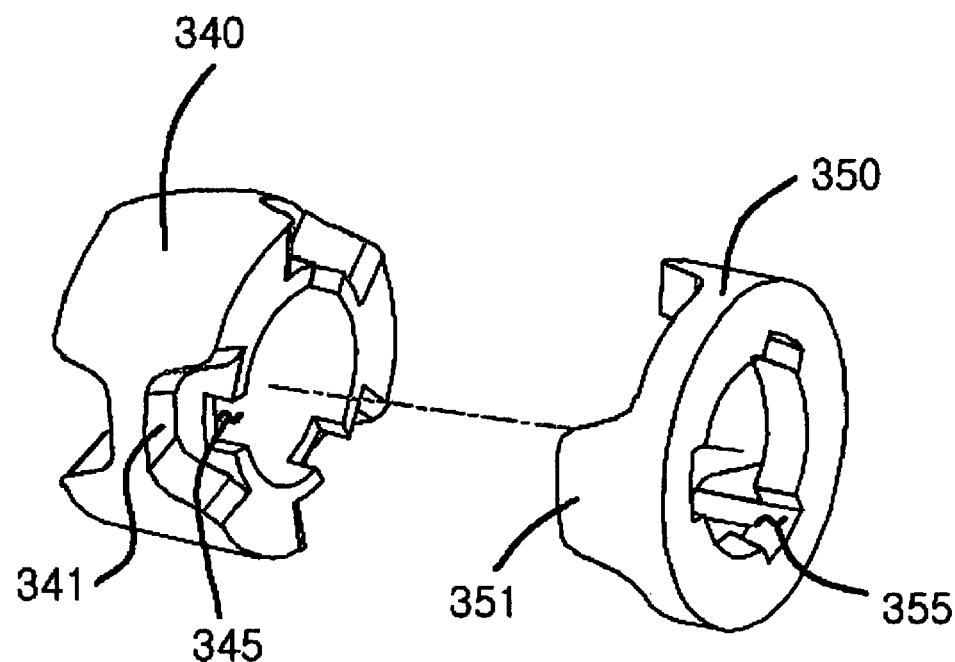
FIG. 6 is a perspective view showing a holder cam and a sub cam according to one embodiment of the present invention.
Figure 6:
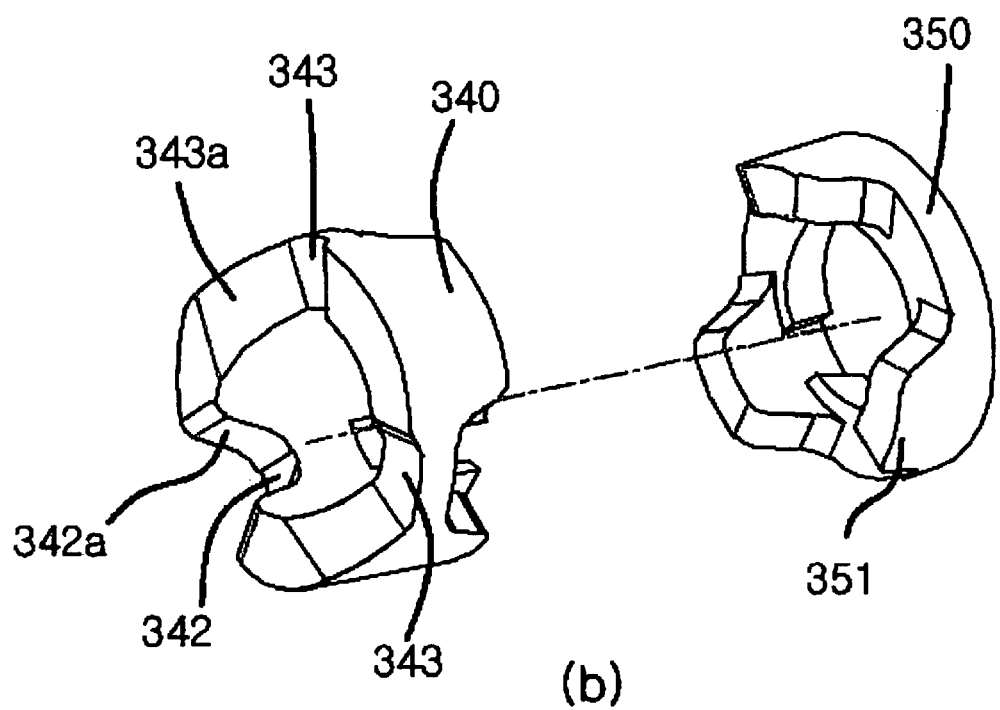
Figure 7:
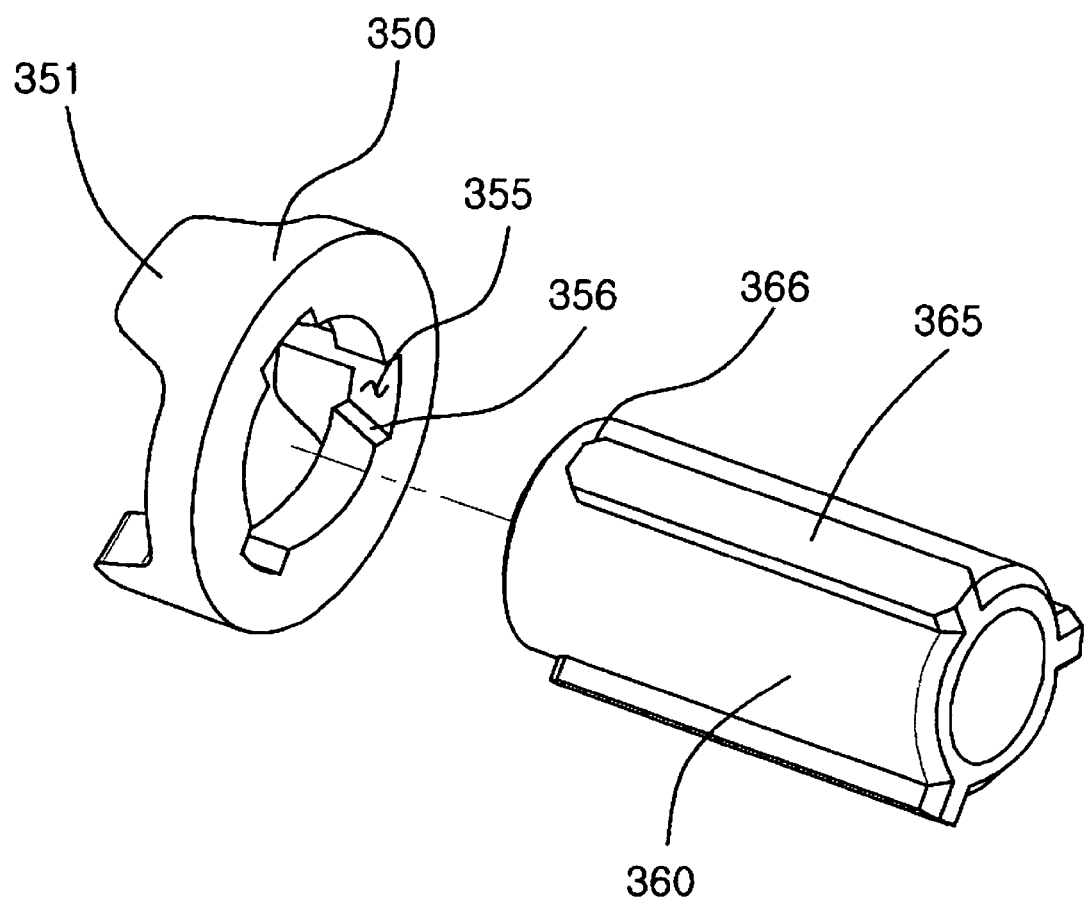
FIG. 7 is a perspective view showing a sub cam and a slider according to one embodiment of the present invention.
Figure 8:
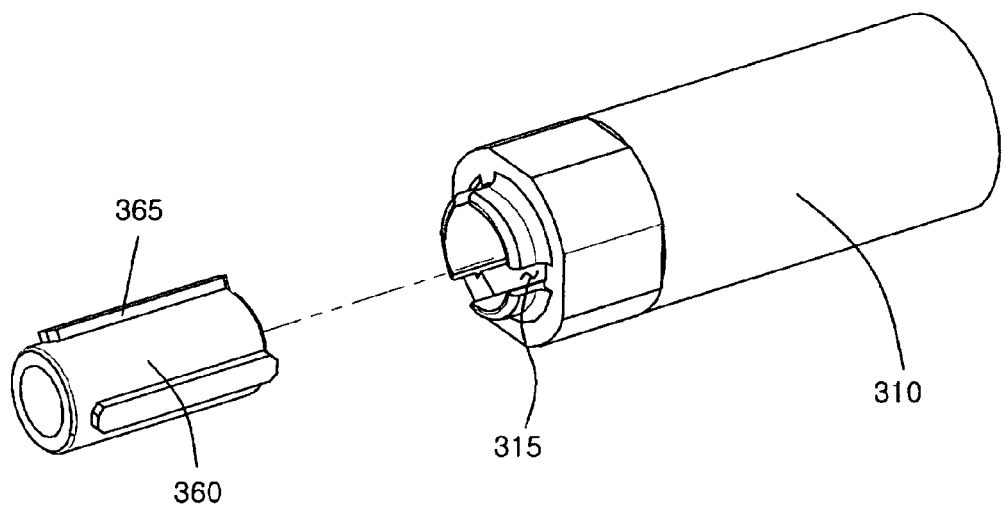
FIG. 8 is a perspective view showing a slider and a first housing according to one embodiment of the present invention.
Figure 9:
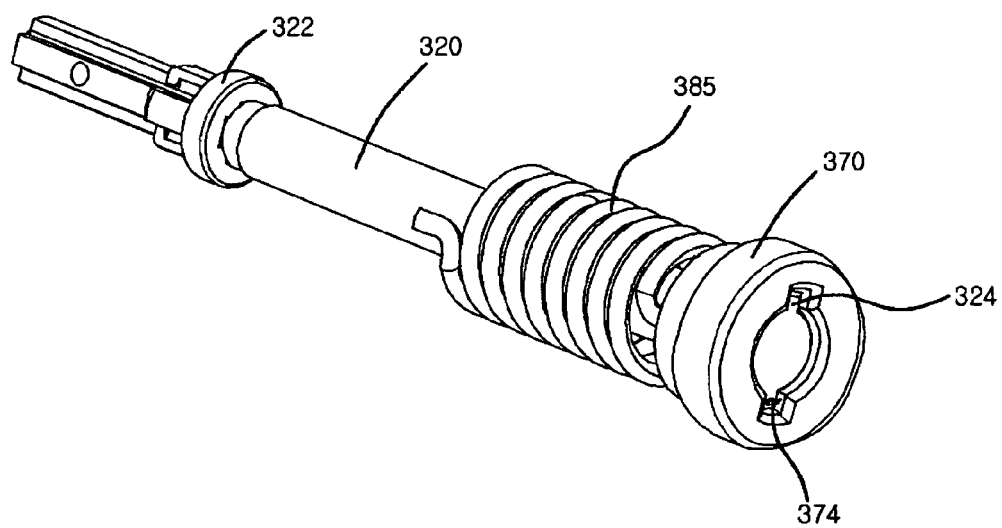
FIG. 9 is a perspective view showing a coupling between a shaft, an engagement member and a stopper according to one embodiment of the present invention.
Figure 10:
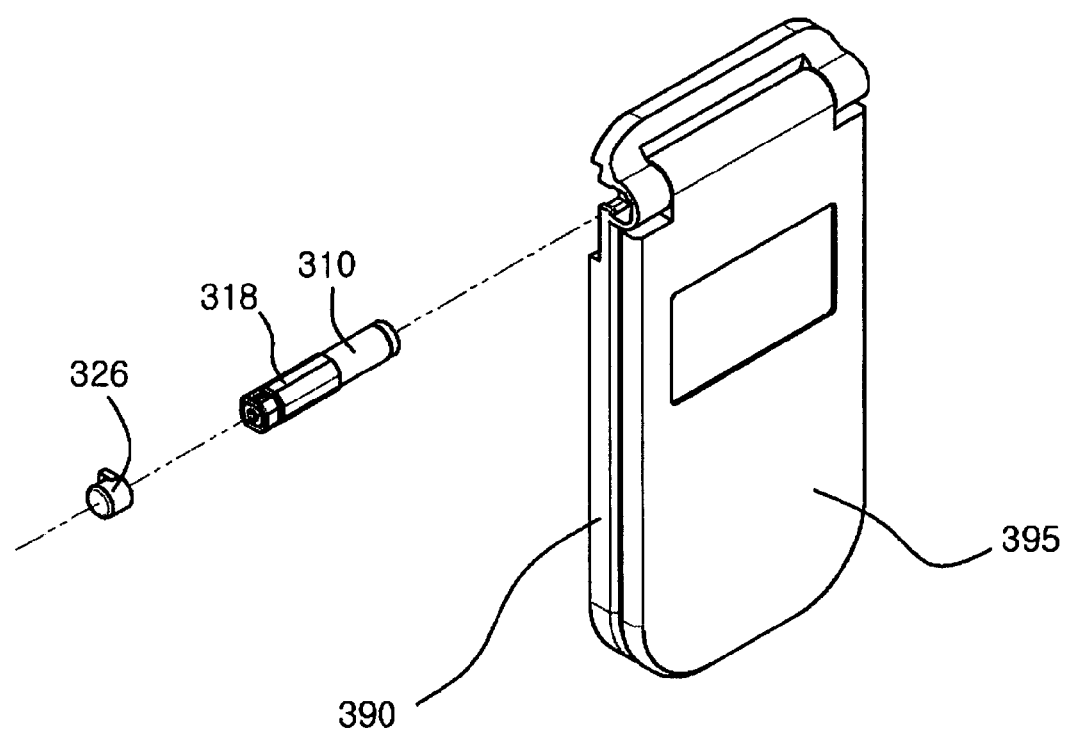
FIG. 10 is an exploded perspective view showing an automatic hinge module and a cellular phone according to one embodiment of the present invention.

FIG. 1 is a perspective view of an automatic hinge module of a cellular phone according to one embodiment of the present invention. FIG. 2 is an exploded perspective view in one direction showing an automatic hinge module of a cellular phone according to one embodiment of the present invention. FIG. 3 is an exploded perspective view in another direction showing an automatic hinge module of a cellular phone according to one embodiment of the present invention. FIG. 6 is a perspective view showing a holder cam and a sub cam according to one embodiment of the present invention. FIG. 7 is a perspective view showing a sub cam and a slider according to one embodiment of the present invention. FIG. 8 is a perspective view showing a slider and a first housing according to one embodiment of the present invention. FIG. 9 is a perspective view showing a coupling between a shaft, an engagement member and a stopper according to one embodiment of the present invention. FIGS. 4 and 5 are perspective views showing an automatic hinge module of a cellular phone according to one embodiment of the present invention, wherein some components are shown as cut outs. FIG. 10 is an exploded perspective view showing an automatic hinge module and a cellular phone according to one embodiment of the present invention.

An automatic hinge module of a cellular phone of the present invention comprises a first housing 310, a second housing 318, a shaft 320, a button 326, a main cam, a sub cam 350, a first spring 381, a slider 360, an engagement member 322, a second spring 382, a stopper 370, a torsion spring 385, etc.

The first housing 310 has a hollow shape with its longitudinal sides open.

Inside the first housing 310 are mounted a portion of the shaft 320, the second spring 382, the stopper 370 and the torsion spring 385.

The second housing 318 has a hollow shape. The second housing is mounted to surround one side of the first housing 310, thereby being rotated together with the first housing 310. The outside of the second housing 318 is coupled to a folder portion 395 of a cellular phone shown in FIG. 10.

Inside the second housing 318 are mounted a portion of the shaft 320, the main cam, the sub cam 350, the engagement member 322, the slider 360 and the first spring 381.

The shaft 320 is mounted so as to pass through the first housing 310 and the second housing 318. Further, the shaft 320 is mounted such that it only linearly moves and does not rotate.

To this end, one end of the shaft 320 is coupled to a fixed cam 330 among the main cam, which is fixedly coupled to a main body 390 of the cellular phone (which will be described later), so as not to be rotated relative thereto.

To the one end of the shaft 320 is mounted the button 326 which a user can press.

Also, in the middle of the shaft 320, the engagement member 322, which is contacted to the slider 360 and moves the same, is mounted.

While the engagement member 322 may be integrally formed to the shaft 320, it is fabricated separately and coupled thereto for convenience in assembly.

As shown in FIG. 9, the engagement member 322 is fixedly coupled to the shaft 320 so as to move together with the shaft 320.

The main cam is mounted to surround the shaft 320. The main cam comprises the fixed cam 330 and a holder cam 340.

The fixed cam 330 is mounted in close proximity with the button 326 in order to surround the shaft 320. A second cam protrusion 332 is protrudingly formed on the fixed cam opposite to the button 326, i.e., towards the holder cam 340.

The shaft 320 is not permitted to be separately rotated relative to the fixed cam 320. Instead, it is permitted to linearly move separately relative to the fixed cam.

To this end, while the fixed cam 330 is mounted so as to surround the shaft 320, the inner side of the fixed cam 330 and the outer side of the shaft 320 are configured to have stepped portions engageable to each other. This is so that the shaft 320 cannot be separately rotated relative to the fixed cam 330.

Further, elongated openings 334 are formed at the fixed cam 330 in movement directions of the shaft 320. A securing pin 339 penetrating the shaft 320 is mounted in the elongated openings 334.

In other words, the fixed cam 330 and the shaft 320 are coupled via the securing pin 339. The shaft 320 linearly moves along the elongated openings 334 together with the securing pin 339.

The securing pin 339 couples the fixed cam 330 and the shaft 320 to each other. This prevents the components of the present invention from being separated from one another by elastic forces of the first spring 381, the second spring 382 and the torsion spring 385 to thereby form one single assembly.

The fixed cam 330 can be directly fixed to the main body 390 of the cellular phone. Further, as shown in the figures, the fixed cam may be coupled to the main body 390 of the cellular phone via a fixed cam cover 336 configured to surround the fixed cam 330.

In case of using the fixed cam cover 336, elongated openings 338, along which the securing pin 339 can slide, are formed at the fixed cam cover 336.

The holder cam 340 is mounted so as to simply surround the shaft 320. The holder cam can separately rotate and linearly move relative to the shaft 320.

The holder cam 340 is interposed between the fixed cam 330 and the sub cam 350. The holder cam can be in camming contact with both the fixed cam 330 and the sub cam 350.

As shown in FIG. 6, a second cam groove 342 and a third cam groove 343 for seating the second cam protrusion 332 thereon are formed at the holder cam 340 toward the fixed cam 330.

When the holder cam 340 is rotated at 0 degree, the second cam protrusion 332 is seated on the second cam groove 342. When the holder cam 340 is rotated by a certain angle (e.g., 120 degrees), the second cam protrusion 332 is seated on the third cam groove 343.

An interval between the second cam groove 342 and the third cam groove 343 is set to be identical to a spaced distance between the first cam grooves 341 provided at the sub cam 350.

Further, as shown in FIG. 6(b), a sloped surface 343a of the third cam groove 343 is gentler than a sloped surface 342a of the second cam groove 342.

The sub cam 350 is mounted to simply surround the shaft 320 such that the sub cam can be rotated relative to the shaft 320 and be linearly moved separately relative thereto.

The sub cam 350 is in camming contact with the holder cam 340 of the main cam.

To this end, as shown in FIG. 6, a plurality of first cam protrusions 351 are protrudingly formed at the sub cam 350 toward the holder cam 340, while numerous first cam grooves 341, into which the first cam protrusion 351 are inserted, are formed at the holder cam 340.

The first cam protrusions 351 and the first cam grooves 341 are spaced apart at same intervals.

Preferably, the first cam protrusions 351 and the first cam grooves 341 are spaced apart at an interval of 120 degrees.

Further, between the sub cam 350 and the first housing 310, the first spring 381 elastically supporting the sub cam 350 toward the main cam is mounted, as shown in FIGS. 4 and 5.

As shown in FIG. 5, a first slot-hole 355, into which a locking protrusion 365 of the slider 360 is inserted, is formed at the other side opposite to the side of the sub cam 350, at which the first cam protrusions 351 are formed.

The slider 360 is rotatably mounted to the shaft 320 while surrounding the shaft 320

The shaft 320 is inserted into the sub cam 350 at its one end and into the first housing 310 at its opposite end to thereby rotate together with the sub cam 350 and/or the first housing 310.

To this end, the locking protrusion 365 is protrudingly formed on the outer periphery surface of the sub cam 350. Further, as shown in FIG. 7, a first slot-hole 355, into which one end of the locking protrusion 365 is inserted, is formed at the sub cam 350. Furthermore, as shown in FIG. 8, a second slot-hole 315, into which the opposite end of the locking protrusion 365 is inserted, is formed at the first housing 310.

The locking protrusion 365, the first slot-hole 355 and the second slot-hole 315 are provided in plurality. Each of them is spaced apart at same intervals.

Preferably, the locking protrusions 365, the first slot-holes 355 and the second slot-holes 315 are spaced apart at an interval of 120 degrees.

As shown in FIG. 7, a second sloped surface 366 is formed at the locking protrusion 365, while a first sloped surface 356 is formed at the first slot-hole 355. The first sloped surface is brought into contact with the second sloped surface 366 in a direction where the torsion spring 385 slackens and rotates.

Further, the first cam protrusions 351 are spaced apart at same intervals as the first slot-holes 355.

Also, as shown in FIG. 6, third slot-holes 345, into which the locking protrusions 365 of the slider 360 are inserted, are formed at the holder cam 340.

As shown in FIGS. 4 and 5, between the slider 360 and the first housing 310, the second spring 382, which elastically supports the slider 360 toward the main cam, is mounted.

One end of the torsion spring 385 is fixed to the first housing 310 and the opposite end of the torsion spring 385 is fixed to the stopper 370.

The torsion spring 385 is mounted inside the first housing 310 as compressed.

In such a case, in order to slacken the compressed torsion spring 385 to rotate the first housing 310, the stopper 370 must be fixedly and non-rotatably coupled.

To this end, as shown in FIG. 9, the stopper 370 is joined to the opposite end of the shaft 320, which does not rotate.

Further, the stopper 370 is joined to the opposite end of the first housing 310 such that the first housing 310 can be rotated.

Specifically, the stopper 370 is joined to the shaft 320, which is not allowed to rotate due to engagement to the fixed cam 330, and is inhibited from rotating. The shaft 320 is mounted so as to linearly move relative to the stopper 370.

To this end, anti-rotation protrusions 324 are bilaterally formed at the opposite end of the shaft 320, while anti-rotation grooves 374, into which the anti-rotation protrusions 324 are inserted, are formed at the stopper 370 along a length direction of the shaft 320.

Accordingly, the stopper 370 is inhibited from being separately rotated relative to the shaft by means of the anti-rotation protrusions 324 and the anti-rotation grooves 374. However, since the anti-rotation protrusions 324 of the shaft 320 can be linearly moved along the anti-rotation grooves 374, the shaft 320 can be linearly moved separately relative to the stopper 370.

The anti-rotation grooves 374 may be formed at the opposite end of the shaft 320, while the anti-rotation protrusions 324 may be formed at the stopper 370.

In summary, since the fixed cam 330, the shaft 320 and the stopper 370 are coupled to one another so as to be non-rotatable separately to one another and the fixed cam 330 is fixedly coupled to the main body 390 of the cellular phone, the fixed cam 330, the shaft 320 and the stopper 370 are not allowed to rotate.

The operations of the present invention will now be described below.

Figure 11:
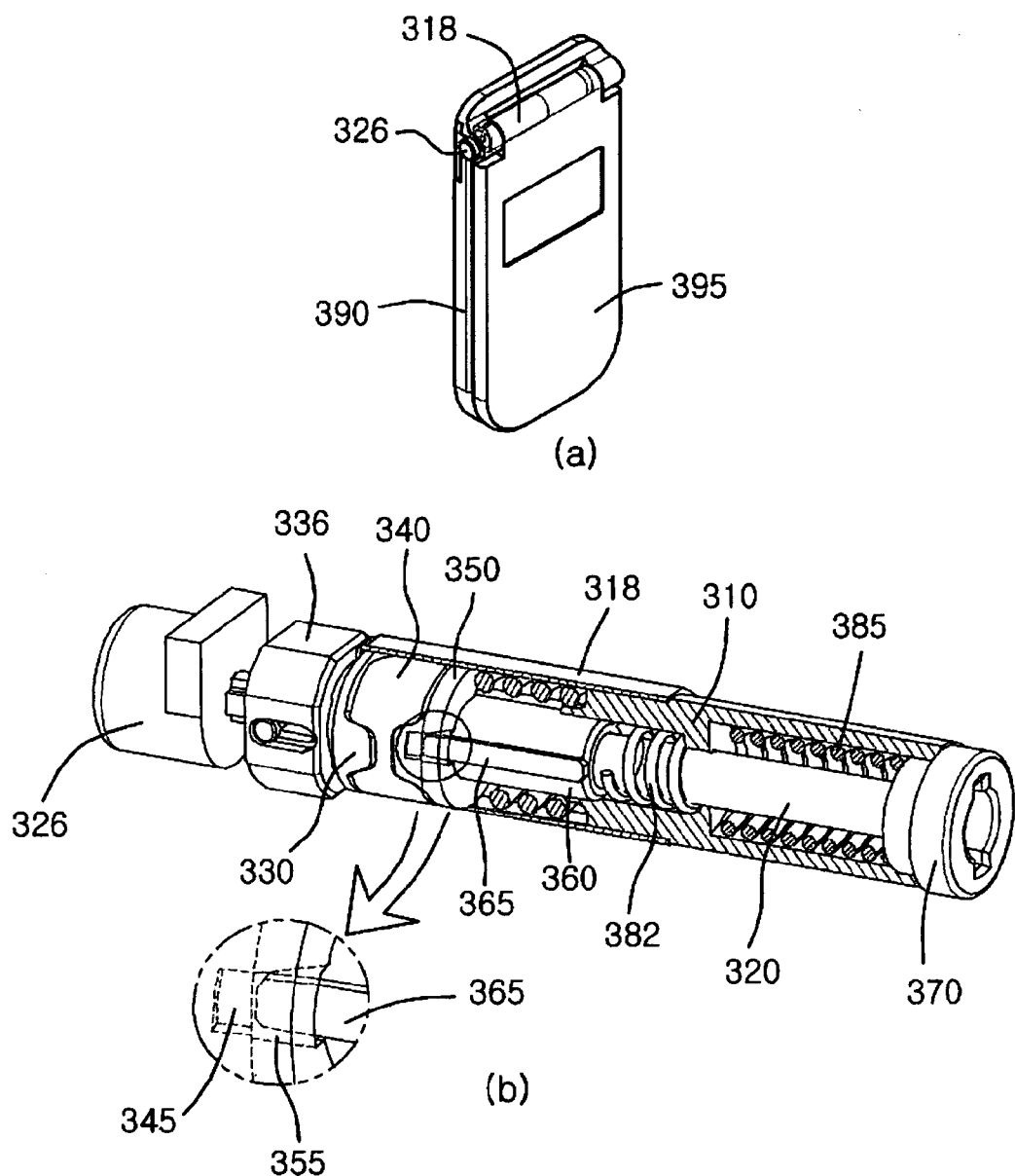
FIG. 11 is a schematic view of an operation wherein a folder portion of a cellular phone according to one embodiment of the present invention is closed.

FIG. 11 is a schematic view of an operation wherein a folder portion of a cellular phone according to one embodiment of the present invention is closed.

When the folder portion 395 is closed as shown in FIG. 11, the torsion spring 385, which is mounted as compressed, produces a rotating force. However, the first housing 310, to which the one end of the torsion spring 385 is fixed, and the sub cam 350 are interlocked via the slider 360.

Further, the sub cam 350 is in cam engagement with the holder cam 340. The holder cam 340 is engaged to the fixed cam 330, which is fixedly and non-rotatably coupled to the main body 390 of the cellular phone. Thus, the first housing 310 is not permitted to rotate. As such, the folder portion 395, to which the first housing 310 and the second housing 318 are joined, is not permitted to rotate as well.

Moreover, the opposite end of the torsion spring 385 is coupled to the stopper 370 interlocking together with the shaft 320. Since the shaft 320 is non-rotatably engaged to the fixed cam 330, the stopper 370 is also not permitted to rotate. Accordingly, the torsion spring 385 stays non-rotatable in both directions.

Automatic Opening

Figure 12:
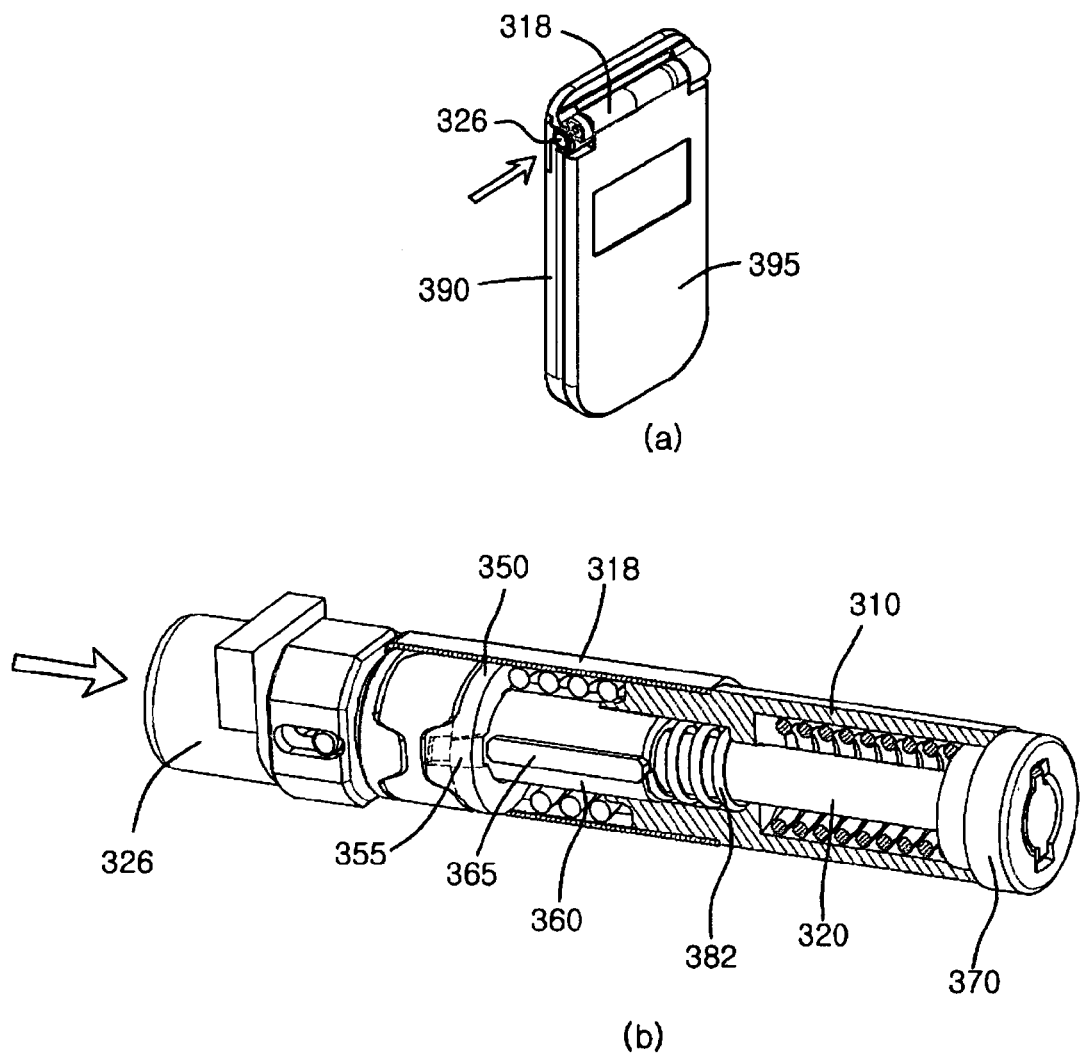
FIG. 12 is a schematic view of an operation wherein a button is pressed for an automatic rotation in FIG. 11.
Figure 13:
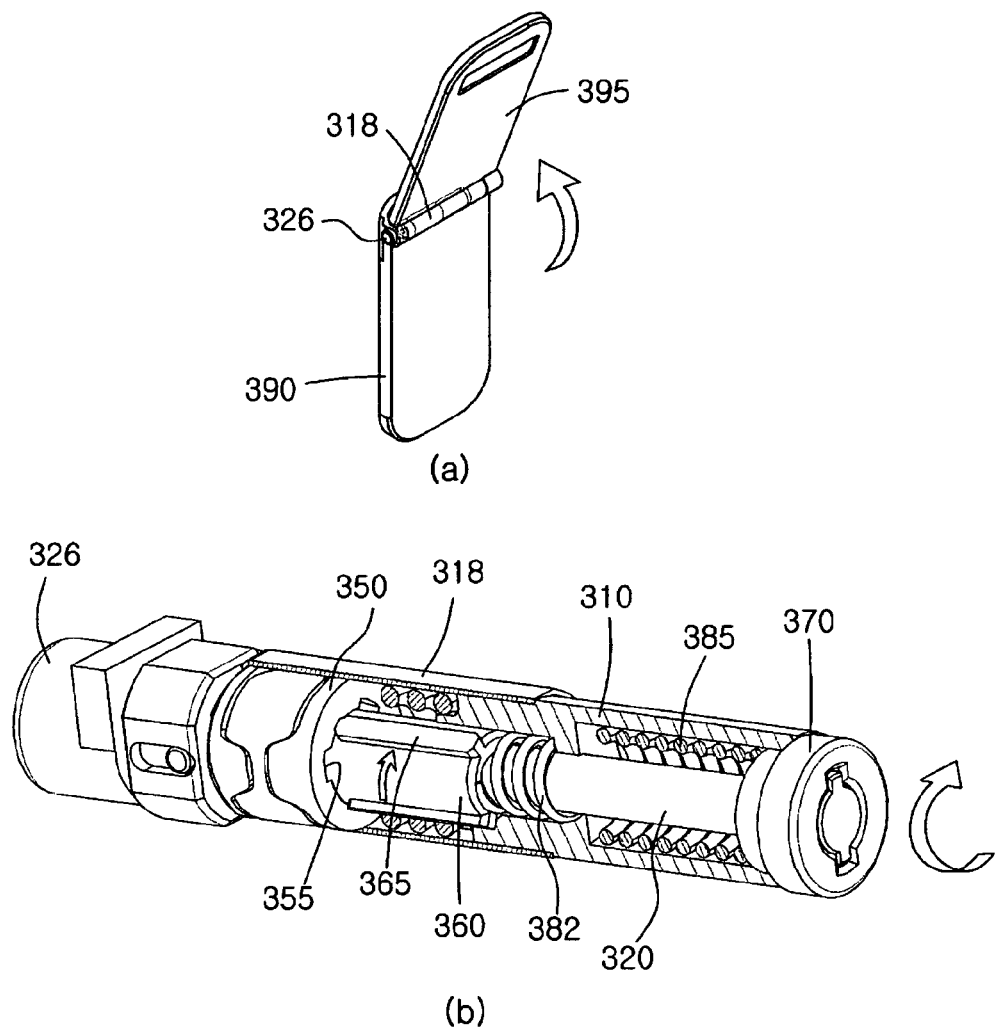
FIG. 13 is a schematic view of an operation wherein a folder portion of a cellular phone is fully opened (rotated by 160 degrees) in FIG. 12.
Figure 14:
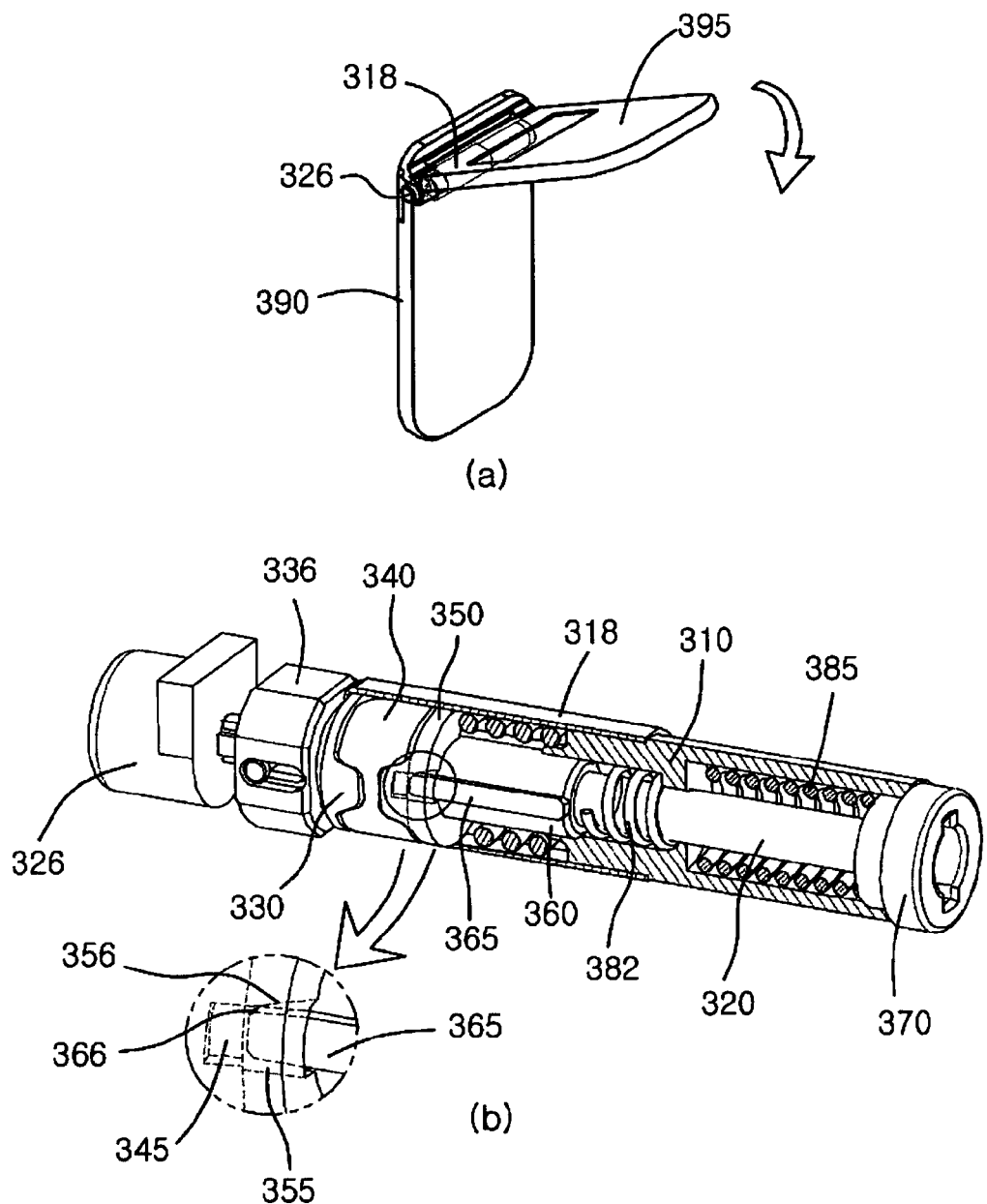
FIG. 14 is a schematic view of an operation wherein a folder portion of a cellular phone is rotated by 120 degrees in FIG. 12.
Figure 15:
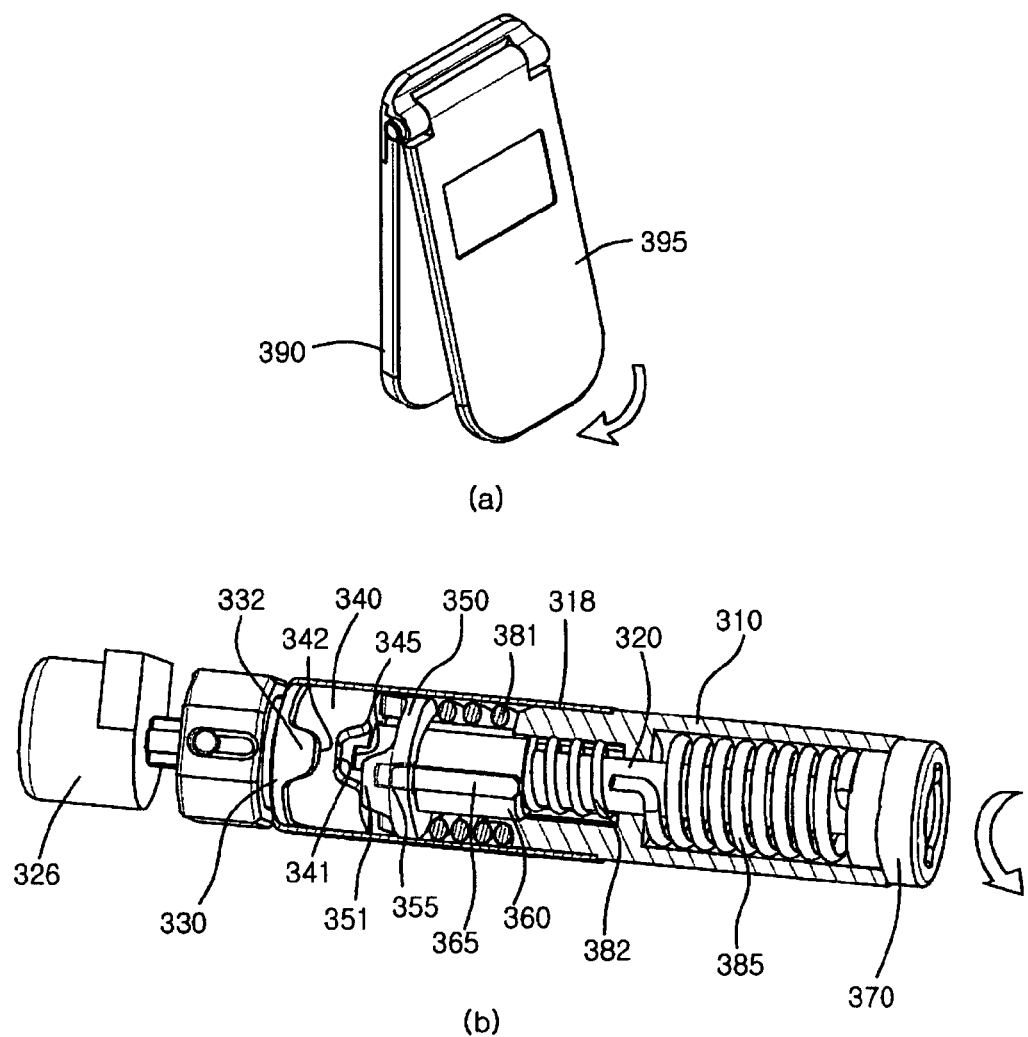
FIG. 15 is a schematic view of an operation wherein a folder portion of a cellular phone is reversely rotated for closing in FIG. 14.

FIG. 12 is a schematic view of an operation wherein the button is pressed for automatic rotation in FIG. 11. FIG. 13 is a schematic view of an operation wherein the folder portion is fully opened (rotated by 160 degrees) in FIG. 12. FIG. 14 is a schematic view of an operation wherein the folder portion is rotated by 120 degrees in FIG. 12. FIG. 15 is a schematic view of an operation wherein the folder portion is reversely rotated for closing in FIG. 14.

When the folder portion 395 is closed as shown in FIG. 11, if a user presses the button 326 toward a right side as shown in FIG. 12, then the movement of the button 326 moves the engagement member 322 and the shaft 320 right.

At this time, the shaft 320 is moved right along the anti-rotation grooves 374 formed at the stopper 370.

Further, the slider 360, which is in contact with the engagement member 322, is moved right while compressing the second spring 382.

Along with the movement of the slider 360, the locking protrusions 365, which are inserted into the first slot-holes 355 of the sub cam 350, are separated from the first slot-holes 355 and is moved away therefrom.

As the slider 360 is moved away from the sub cam 350, the slackening force of the compressed torsion spring 385 rotates the first housing 310.

Specifically, the one end of the torsion spring 385 is fixed to the first housing 310 and the opposite end thereof is fixed to the stopper 370. Further, the stopper 370 is fixedly coupled to the main body 390 of the cellular phone via the shaft 320 and the fixed cam 330. Thus, the first housing 310 is relatively rotated.

The second housing 318, which surrounds the first housing 310, and the slider 360 inserted into the second slot-holes 315 of the first housing 310 are rotated together by the rotation of the first housing 310.

Along with a rotation of the second housing 318, the folder of the cellular phone, to which the second housing 318 is joined, is rotated together.

As shown in FIG. 13, the first housing 310, the second housing 318 and the slider 360 are rotated by about 160 degrees to thereby allow the folder portion 395 to be fully opened.

In such a case, the button 326 is pressed until the folder portion 395 is fully opened. This is so that when the slider 360 is rotated by 120 degrees during rotation thereof, it is not inserted into the first slot-holes 355 arranged at an interval of 120 degrees.

When a user needs to change the fully opened position of the cellular phone into a position opened at an angle of about 120 degrees, the user reversely rotates the folder portion 395 as shown in FIG. 14.

The reverse rotation of the folder portion 395 reversely rotates the first housing 310, the second housing 318 and the slider 360.

If the cellular phone is opened at an angle of about 120 degrees, then the locking protrusions 365 formed at the slider 360 are aligned with the first slot-holes 355 formed at the sub cam 350. At this time, as shown in FIG. 14, the locking protrusions 365 are inserted into the first slot-holes 355 by an elastic restoring force of the compressed second spring 382 and the slider 360 is inserted and secured to the sub cam 350 thereby.

In such a case, the elastic force of the torsion spring 385 must be less than the force capable of rotating the slider 360.

When the user wants to fully open the folder portion 395 at an angle of 160 degrees once again, the user manually rotates the folder portion 395.

In order to fully open the folder portion 395 at an angle of 160 degrees, the first housing 310, the second housing 318 and the slider 360 must be rotated by the normal rotation of the folder of the cellular phone. The locking protrusions 365 formed at the slider 360 stay as inserted into the first slot-holes 355.

However, as shown in FIGS. 6 and 14, the first sloped surface 356 is formed at the first slot-hole 355 in the slackening direction of the torsion spring 385, while the second sloped surface 366 corresponding to the first sloped surface 365 is formed at the locking protrusion 365. Thus, the second sloped surface 366 of the locking protrusion 365 is separated from the sub cam 350 while proceeding along the first sloped surface 356 formed at the first slot-hole 355.

As the slider 360 is separated from the sub cam 350, the first housing 310, the second housing 318 and the slider 360 are rotated again up to 160 degrees by the elastic force of the torsion spring 385.

When the user wants to fully close the folder portion 395, the user reversely rotates the folder portion 395 from a state where the folder portion 395 is opened at an angle of 120 degrees as shown in FIG. 14, i.e., from a state where the locking protrusions 365 of the slider 360 are inserted in the first slot-holes 355 of the sub cam 350.

Then, as shown in FIG. 15, the first housing 310, the second housing 318 and the slider 360 are reversely rotated while compressing the torsion spring again. As a result, the sub cam 350, in which the slider 360 is inserted, is reversely rotated while compressing the first spring 381.

Specifically, as the first cam protrusions 351 of the sub cam 350 are disengaged from the first cam grooves 341 of the holder cam 340 while sliding thereon, the first spring 381 is compressed.

In such a case, a friction force generated between the second cam protrusion 332 of the fixed cam 330 and the second cam groove 342 of the holder cam 340 must be greater than a friction force between the first cam protrusions 351 of the sub cam 350 and the second cam groove 342 of the holder cam 340.

When the sub cam 350 is reversely rotated by 120 degrees from the state shown in FIG. 14, the first cam protrusion 351 is aligned with another first cam groove 341, which is formed at the holder cam 340 at an interval of 120 degrees.

In such a case, since the first spring 381 stays compressed, the first cam protrusion 351 is inserted into the first cam groove 341 by an elastic restoring force of the first spring 381.

By doing so, the folder portion 395 of the cellular phone can be closed as shown in FIG. 11.

Manual Opening

Figure 16:
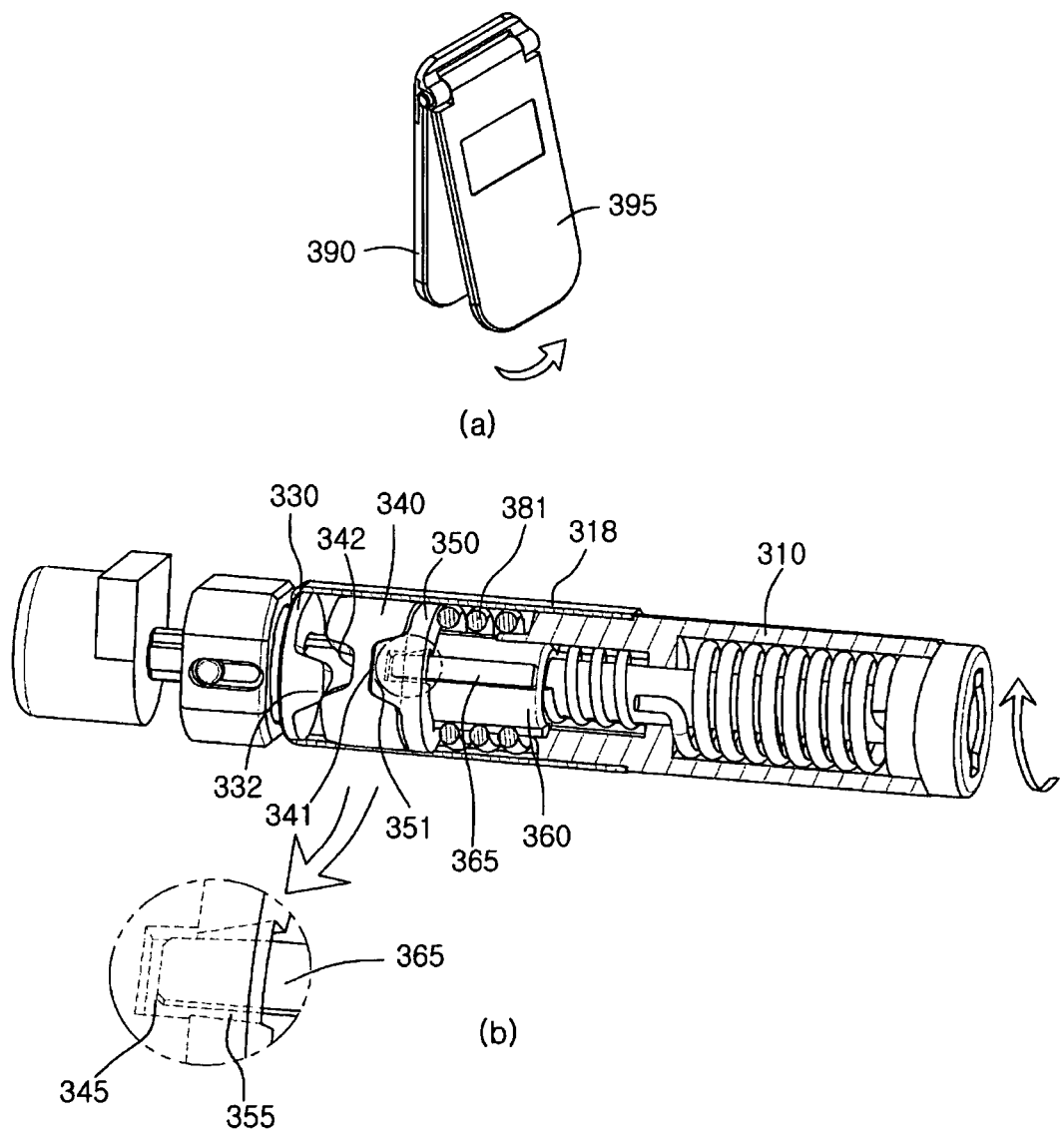
FIG. 16 is a schematic view of an operation wherein a folder portion of a cellular phone is rotated for manual rotation in FIG. 11.
Figure 17:
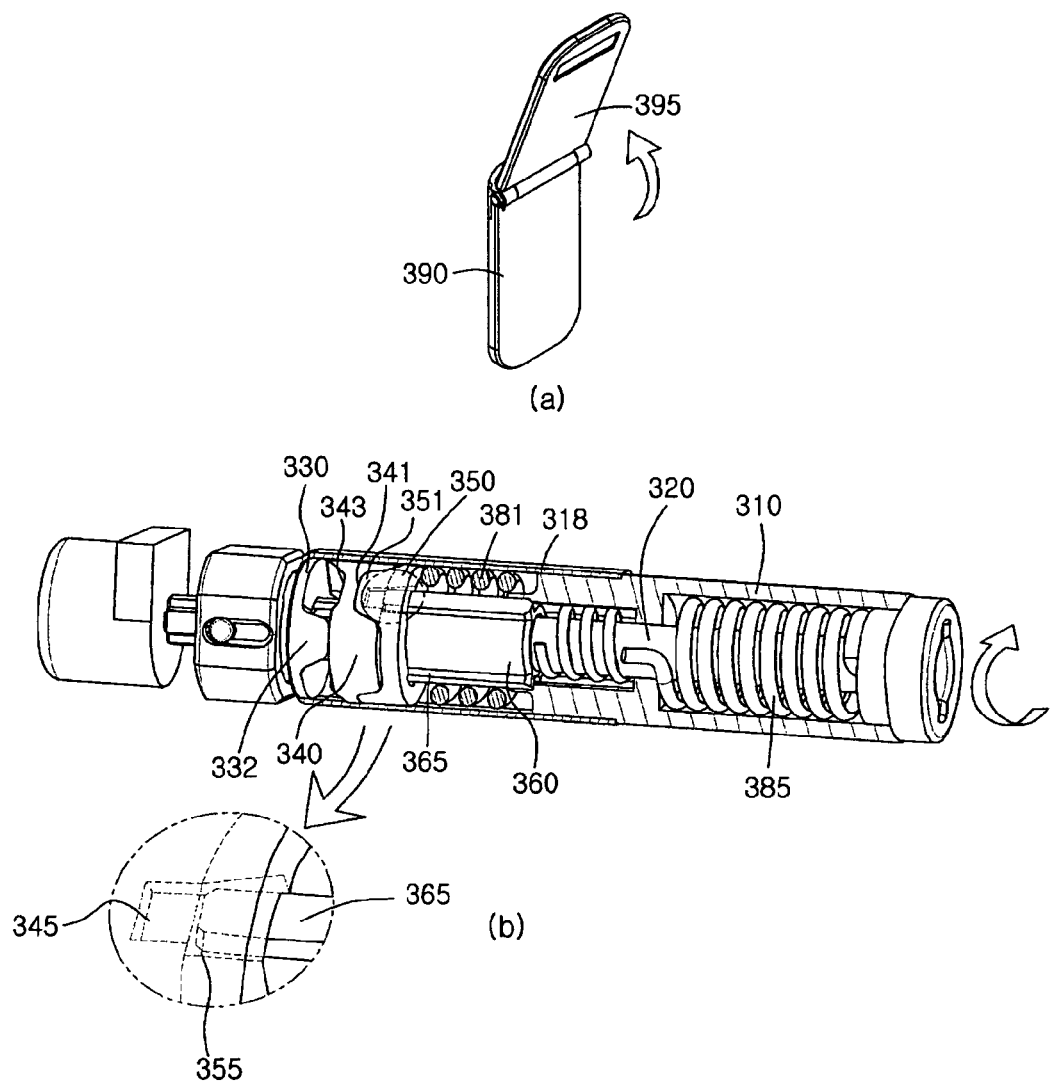
FIG. 17 is a schematic view of an operation wherein a folder portion of a cellular phone is fully opened (rotated by 160 degrees) in FIG. 16.
Figure 18:
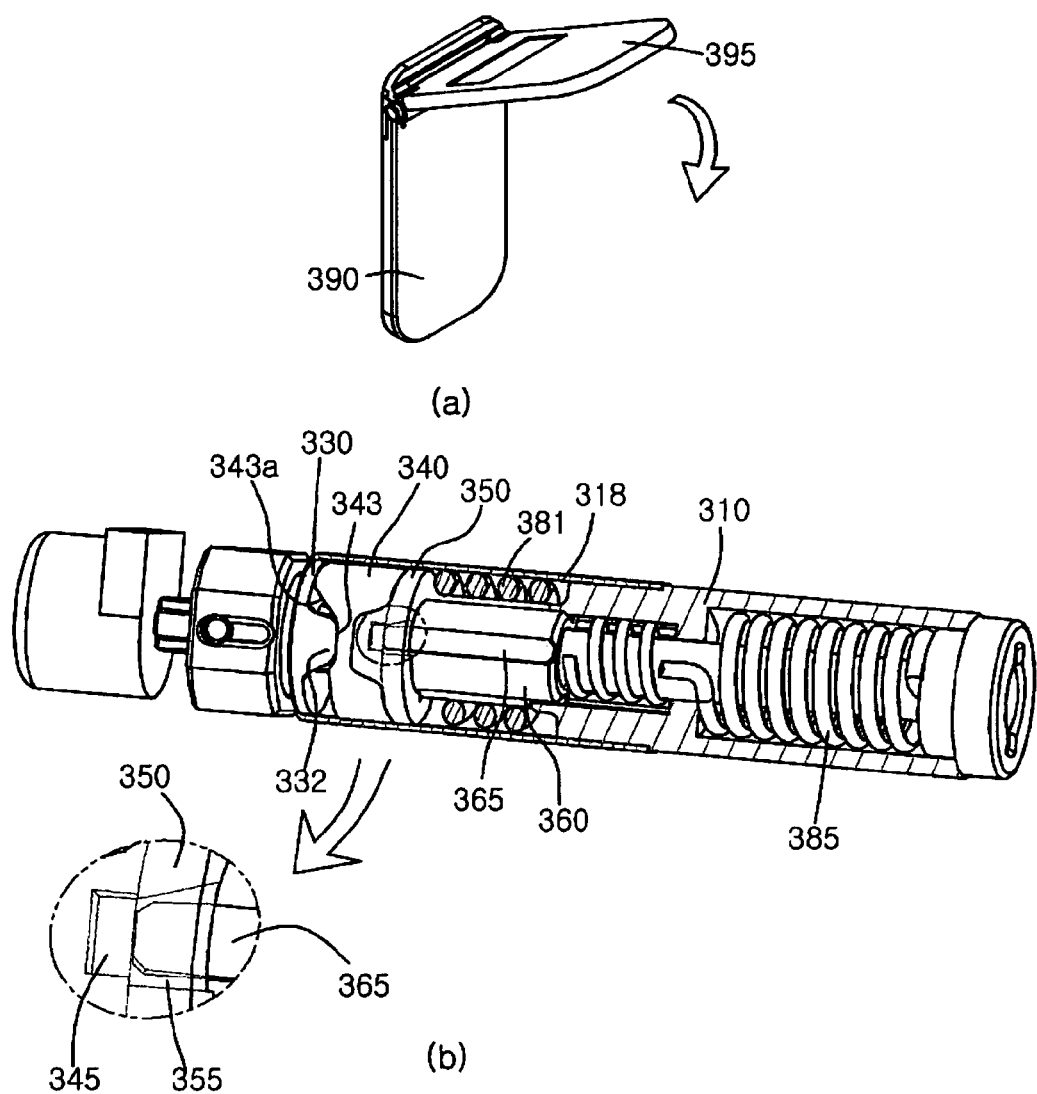
FIG. 18 is a schematic view of an operation wherein a folder portion of a cellular phone is rotated by 120 degrees in FIG. 16.
Figure 19:
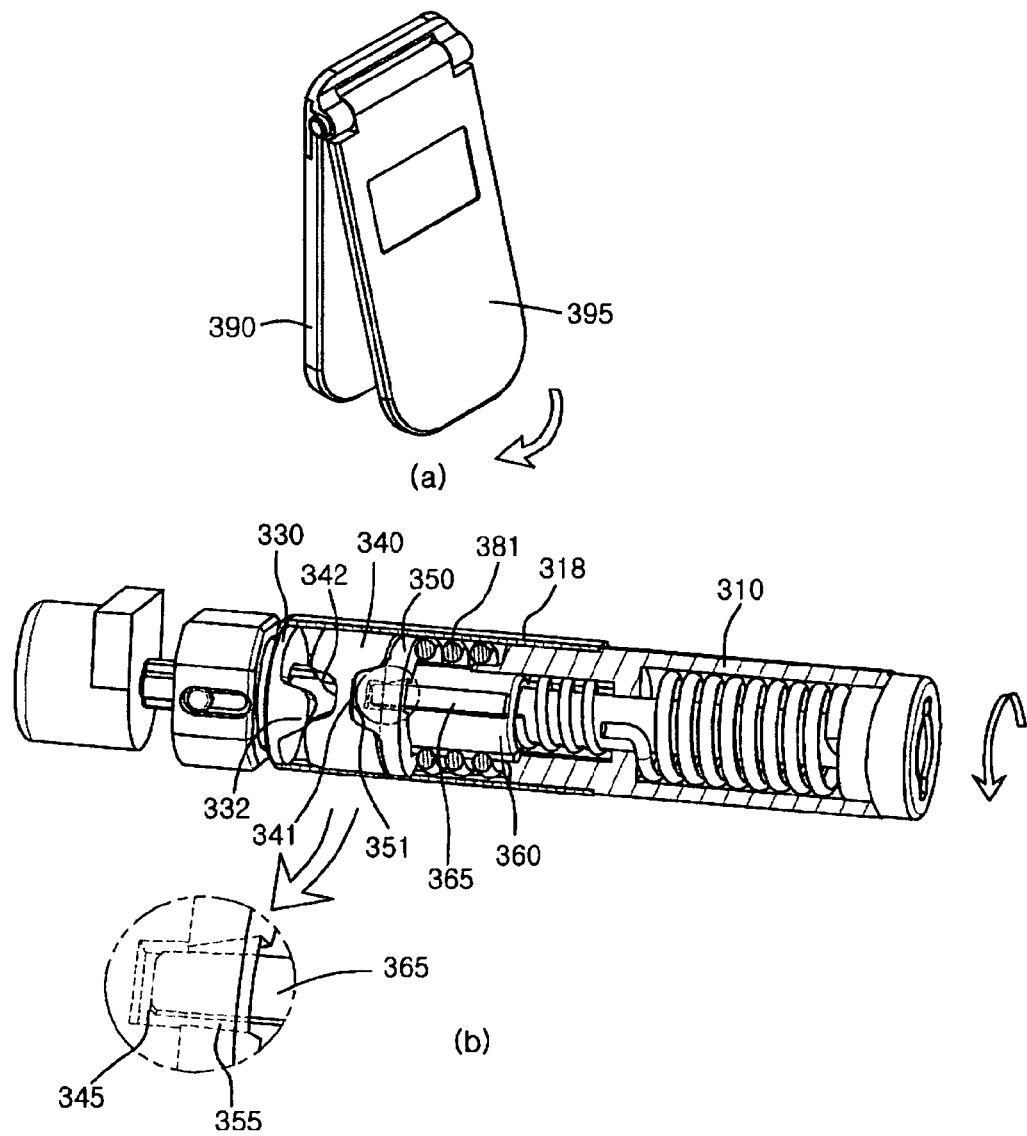
FIG. 19 is a schematic view of an operation wherein a folder portion of a cellular phone is reversely rotated for closing in FIG. 18.

FIG. 16 is a schematic view of an operation wherein the folder portion is somewhat rotated for manual rotation in FIG. 11. FIG. 17 is a schematic view of an operation wherein the folder portion is fully opened (rotated by 160 degrees) in FIG. 16. FIG. 18 is a schematic view of an operation wherein the folder portion is rotated by 120 degrees in FIG. 16. FIG. 19 is a schematic view of an operation wherein the folder portion is reversely rotated for closing in FIG. 18.

To open the folder portion 395 from the closed position of the folder portion 395 shown in FIG. 11, the user grasps and rotates the folder portion 395 instead of pressing the button 326.

As the folder portion 395 is somewhat rotated, the first housing 310, the second housing 318 and the slider 360 are normally rotated as shown in FIG. 16.

As the slider 360 rotates, the sub cam 350, into which the slider 360 is inserted, is rotated while compressing the first spring 381. In addition, the holder cam 340, which is in camming contact with the sub cam 350, is also rotated.

When the holder cam 340 is rotated together with the sub cam 350, the holder cam 340 is moved in a direction of compressing the first spring 381 and is somewhat rotated due to a friction force generated between the first cam protrusions 351 and the first cam grooves 341 during the rotation of the sub cam 350.

At this time, the locking protrusions 365 of the slider 360 are inserted into the third slot-holes 345 formed at the holder cam 340.

Accordingly, the holder cam 340 is rotated together with the slider 360 via the locking protrusions 365 similar to the sub cam 350.

If the second cam protrusions 332 formed at the fixed cam 330 is disengaged from the second cam groove 342 of the holder cam 340, the first housing 310, the second housing 318, the slider 360, the sub cam 350 and the holder cam 340 are rotated together by the elastic restoring force of the torsion spring 385.

Specifically, since the torsion spring 385 is coupled to the first housing 310 at its one end and to the stopper 370 at its opposite end and the stopper 370 is non-rotatably fixed to the main body 390 of the cellular phone via the shaft 320 and the fixed cam 330, the first housing 310 is allowed to rotate during slackening of the torsion spring 385.

In such a case, as shown in FIG. 17, the holder cam 340 is rotated such that the second cam protrusion 332 goes beyond the third cam groove 343 spaced apart from the second cam groove 342 by 120 degrees up to 160 degrees.

To this end, a flat portion or a slightly raised portion is formed at a side of the third cam groove 343, which is distantly spaced from the second cam groove 342. This is so that the second cam protrusion 332 can be further rotated beyond the third cam groove 343.

As the second cam protrusion 332 approaches the third cam groove 343, the sub cam 350 and the holder cam 340 are strongly moved and rotated toward the fixed cam 330 by the elastic restoring force of the compressed first spring 381.

Along with the rotation of the second housing 318, the folder portion 395 is fully opened at an angle of 160 degrees, as shown in FIG. 17.

When the user needs to open the cellular phone at an angle of 120 degrees as shown in FIG. 18 in a state where the cellular phone is fully opened at an angle of 160 degrees, the user reversely rotates the folder portion 395.

The reverse rotation of the folder portion 395 reversely rotates the first housing 310, the second housing 318, the sub cam 350 and the holder cam 340.

Such a reverse rotation is continued until the second cam protrusion 332 is seated in the third cam groove 343.

When the user wants to open the folder portion 395 by 160 degrees again from such a state, the user manually rotates the folder portion 395.

In such a case, since the sub cam 350 and the holder cam 340 is in strong contact with the second cam protrusion 332 under the elastic force of the first spring 381, the sub cam 350 and the holder cam 340 can be prevented from being arbitrarily rotated.

Further, when the user wants to fully close the folder portion 395, the user reversely rotates the folder portion 395 from a state shown in FIG. 18 where the folder portion 395 is opened at an angle of 120 degrees, i.e., from a state where the second cam protrusion 332 is seated in the third cam groove 343.

The first housing 310, the second housing 318, the slider 360, the sub cam 350 and the holder cam 340 are then reversely rotated while compressing the torsion spring 385 again.

Further, the holder cam 340 is somewhat moved in a direction of compressing the first spring 381 by a friction force generated between the first cam protrusion 351 and the first cam groove 341 while sliding on the sloped surface 343a of the third cam groove 343.

At this time, the locking protrusion 365 of the slider 360 is inserted into the third slot-hole 345 formed at the holder cam 340. Thus, the holder cam 340 is rotated together with the slider 360.

To this end, a friction force generated between the second cam protrusions 332 of the fixed cam 330 and the second cam groove 342 of the holder cam 340 must be less than a friction force generated between the first cam protrusion 351 of the sub cam 350 and the second cam groove 342 of the holder cam 340.

This can be accomplished by making the sloped surface 343a of the third cam groove 343 gentler than the sloped surface 342a of the second cam groove 342.

As the second cam protrusion 332 approaches the second cam groove 342 along with the reverse rotation of the holder cam 340 as shown in FIG. 19, the holder cam 340 is automatically rotated while the second cam groove 342 is slid along the second cam protrusion 332 under the elastic restoring force of the compressed first spring 381.

The reverse rotation of the holder cam 340 reversely rotates the sub cam 350, the slider 360, the first housing 310 and the second housing 318, thereby reversely rotating the folder portion 395 coupled to the second housing 318. As such, the cellular phone becomes closed as shown in FIG. 11.

In the above-described embodiments, the fixed cam 330 is fixedly coupled to the main body 390 of the cellular phone, while the first housing 310 and/or the second housing 318 are fixedly coupled to the folder portion 395. However, if necessary, the same effects can be obtained in case the fixed cam 330 is fixedly coupled to the folder portion 395 and the first housing 310 and/or the second housing 318 is fixedly coupled to the main body 390 of the cellular phone.

An automatic hinge module for a cellular phone of the present invention should not be limited to the above-described embodiments and may be embodied in various manners within the scope of the subject matter of the present invention.

The invention claimed is:

1. A hinge module for a portable terminal for automatically opening the portable terminal by pressing a button, the hinge module comprising:
a hollow first housing;
a shaft passing through the first housing;
a button coupled to one end of the shaft;
a main cam coupled to the shaft;
a sub cam rotatable in camming contact with the main cam;
a first spring for elastically supporting the sub cam toward the main cam;
a slider rotatably coupled to the shaft and being inserted into the sub cam at one end thereof and into the first housing at an opposite end thereof so as to be rotated together with the sub cam or the first housing;
an engagement member fixedly coupled to the shaft for moving the slider in contact therewith;
a second spring for elastically supporting the slider;
a stopper engaged to the opposite end of the first housing and the opposite end of the shaft; and
a torsion spring fixed to the first housing at one end thereof and to the stopper at the other end thereof.

2. The hinge module of claim 1, wherein:
a locking protrusion is protrudingly formed at a peripheral surface of the slider,
a first slot-hole, into which one end of the locking protrusion is inserted, is formed at the sub cam, and
a second slot-hole, into which the opposite end of the locking protrusion is inserted, is formed at the first housing.

3. The hinge module of claim 2, wherein the engagement member pushes the slider by a movement of the shaft to thereby separate the locking protrusion of the slider from the first slot-hole formed on the sub cam.

4. The hinge module of claim 2, wherein each of the locking protrusion, the first slot-hole and the second slot-hole is formed in plurality as spaced apart at same intervals.

5. The hinge module of claim 4, wherein each of the locking protrusions, the first slot-holes and the second slot-holes is spaced apart at an interval of 120 degrees.

6. The hinge module of claim 2, wherein:
a first sloped surface is formed at the first slot-hole, and
a second sloped surface is formed at the locking protrusion,
the first sloped surface being configured to contact the second sloped surface in a rotational direction of the torsion spring.

7. The hinge module of claim 2, wherein the main cam comprises:
a fixed cam mounted to the shaft; and
a holder cam rotatably mounted to the shaft and being in camming contact with the fixed cam and the sub cam therebetween, wherein the shaft is linearly moved separately relative to the fixed cam.

8. The hinge module of claim 7, wherein:
a plurality of first cam protrusions are protrudingly formed at the sub cam opposite to the first slot-hole,
a plurality of first cam grooves, into which the first cam protrusions are inserted, are formed at the holder cam, and
the first cam protrusions are spaced apart from one another at same intervals as the first slot-holes.

9. The hinge module of claim 7, wherein a third slot-hole, into which the locking protrusion of the slider is inserted, is formed at the holder cam.

10. The hinge module of claim 8, wherein:
a second cam protrusion is formed at the fixed cam toward the holder cam,
a second cam groove and a third cam groove are formed at the holder cam toward the fixed cam,
when the holder cam rotates at 0 degrees, the second cam protrusion is seated in the second cam groove,
when the holder cam rotates, the second cam protrusion is seated in the third cam groove, and
an interval between the second cam groove and the third cam groove is identical to a spaced distance between the first cam grooves.

11. The hinge module of claim 10, wherein a sloped surface of the third cam groove is gentler than a sloped surface of the second cam groove.

12. The hinge module of claim 7, wherein:
an elongated opening is formed at the fixed cam along a movement direction of the shaft, and
a securing pin penetrating the shaft is mounted in the elongated opening.

13. The hinge module of claim 1, wherein the hinge module further comprises a second housing for surrounding the main cam, the sub cam, the slider and the first spring, and wherein the second housing surrounds a portion of the first housing and is rotated together with the first housing.

14. The hinge module of claim 1, wherein:
the opposite end of the shaft is coupled to the stopper,
the stopper is inhibited from being rotated by the shaft, and
the shaft is mounted so as to linearly move relative to the stopper.

15. The hinge module of claim 14, wherein:
an anti-rotation protrusion is protrudingly formed at the opposite end of the shaft,
an anti-rotation groove, into which the anti-rotation protrusion is inserted, is formed at the stopper, and
the shaft is allowed to linearly move separately relative to the stopper and is inhibited from being rotated relative thereto.

16. A portable terminal including the hinge module of claim 1, whereby the hinge module is operable for automatically opening the portable terminal when the button is pressed and a portion the portable terminal is caused to rotate by an elastic restoring force of the torsion spring.

17. A hinge module for a portable terminal, the hinge module comprising:
a housing;
a shaft passing through the housing;
a button coupled to one end of the shaft;
a stopper engaged to the opposite end of the housing and the opposite end of the shaft;
a torsion spring fixed to the housing at one end thereof and to the stopper at the other end thereof;
a cam coupled to the shaft;
a sub cam;
a slider rotatably coupled to the shaft and being inserted into the sub cam at one end thereof and into the housing at an opposite end thereof so as to be rotated together with the sub cam or the housing; and
an engagement member fixedly coupled to the shaft for moving the slider in contact therewith;
wherein the cam comprises a fixed cam mounted to the shaft and a holder cam rotatably mounted to the shaft and being in camming contact with the fixed cam and the sub cam therebetween; and
wherein the shaft is linearly moved separately relative to the fixed cam,
whereby, when the housing and the cam are respectively coupled to a folder portion and a main body of the portable terminal, the hinge module is operable for automatically opening the portable terminal when the button is pressed and the housing is rotated by an elastic restoring force of the torsion spring.

18. A portable terminal comprising a folder portion; a main body, and a hinge module operable for automatically opening the portable terminal, the hinge module including:
a housing coupled to the folder portion of the portable terminal;
a shaft passing through the housing;
a button coupled to one end of the shaft;
a sub cam;
a fixed cam mounted to the shaft such that the shaft is linearly moved separately relative to the fixed cam, the fixed cam coupled to the main body of the portable terminal;
a holder cam rotatably mounted to the shaft and being in camming contact with the fixed cam and the sub cam therebetween;
a slider rotatably coupled to the shaft and being inserted into the sub cam at one end thereof and into the housing at an opposite end thereof so as to be rotated together with the sub cam or the housing;
an engagement member fixedly coupled to the shaft for moving the slider in contact therewith;
a stopper engaged to the opposite end of the housing and the opposite end of the shaft;
a torsion spring fixed to the housing at one end thereof and to the stopper at the other end thereof, such that torsion spring is operable for applying a force for rotating the housing and the folder portion coupled thereto for automatically opening the portable terminal when the button is pressed.

* * * * *